US010274161B2

(12) United States Patent
Vissenberg et al.

(10) Patent No.: US 10,274,161 B2
(45) Date of Patent: Apr. 30, 2019

(54) LED SPOT WITH CUSTOMIZABLE BEAM SHAPE, BEAM COLOR AND COLOR UNIFORMITY

(71) Applicant: PHILIPS LIGHTING HOLDING B.V., Eindhoven (NL)

(72) Inventors: Michel Cornelis Josephus Marie Vissenberg, Roermond (NL); Elise Claude Valentine Talgorn, Eindhoven (NL); Manuela Lunz, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,348

(22) PCT Filed: Jun. 22, 2016

(86) PCT No.: PCT/EP2016/064412
§ 371 (c)(1),
(2) Date: Jan. 2, 2018

(87) PCT Pub. No.: WO2017/001259
PCT Pub. Date: Jan. 5, 2017

(65) Prior Publication Data
US 2018/0195684 A1     Jul. 12, 2018

(30) Foreign Application Priority Data
Jun. 30, 2015    (EP) .................................... 15174454

(51) Int. Cl.
*F21V 3/00*        (2015.01)
*F21V 7/00*        (2006.01)
(Continued)

(52) U.S. Cl.
CPC ............. *F21V 7/0091* (2013.01); *B33Y 80/00* (2014.12); *F21K 9/233* (2016.08); *F21V 3/04* (2013.01);
(Continued)

(58) Field of Classification Search
CPC ........ F21V 7/0091; F21V 13/10; F21V 11/10; F21V 14/04; F21V 14/08; F21Y 2115/00
See application file for complete search history.

(56) References Cited

U.S. PATENT DOCUMENTS 6,623,142 B1 *    9/2003    Lippmann ................. F21V 9/08
                                                            359/888
2008/0198604 A1    8/2008    Kim et al.
(Continued)

FOREIGN PATENT DOCUMENTS

CN         203431722 U      2/2014
CN         203797419 U      8/2014
(Continued)

OTHER PUBLICATIONS

Soraa Snap System, LED MR16 Accessories, "Free Your Imagination With Unlimited Design Possibilities," No Date Listed (3 Pages).

*Primary Examiner* — Ali Alavi
(74) *Attorney, Agent, or Firm* — Akarsh P. Belagodu (57) ABSTRACT

The invention provides a lighting unit (1000) comprising a lighting device (100), wherein the lighting device (100) comprises a light source (10) configured to provide light source light (11) and beam shaping optics (20) configured to shape the light source light into a lighting device beam (101), wherein the lighting device (100) comprises a window (30) comprising an upstream face (31) directed to the light source (10) and a downstream face (32), wherein the lighting unit (1000) further comprises a beam modifier (200) configured adjacent to the window (30) and configured to
(Continued)

intercept at least part of said lighting device beam (101), wherein the lighting device (100) and the beam modifier (200) are configured to modify said lighting device beam (101) to provide a lighting unit beam (1001) downstream from said beam modifier (200), wherein the beam modifier (200) comprises a printed beam modifying element (210).

11 Claims, 6 Drawing Sheets

(51) Int. Cl.
| | |
|---|---|
| *F21V 3/04* | (2018.01) |
| *F21V 9/00* | (2018.01) |
| *F21V 11/16* | (2006.01) |
| *F21V 13/10* | (2006.01) |
| *F21V 13/14* | (2006.01) |
| *F21K 9/233* | (2016.01) |
| *B33Y 80/00* | (2015.01) |
| *F21V 5/04* | (2006.01) |
| *F21Y 101/00* | (2016.01) |
| *F21Y 115/00* | (2016.01) |

(52) U.S. Cl.
CPC ............. *F21V 9/00* (2013.01); *F21V 11/16* (2013.01); *F21V 13/10* (2013.01); *F21V 13/14* (2013.01); *F21V 5/045* (2013.01); *F21Y 2101/00* (2013.01); *F21Y 2115/00* (2016.08)

(56) References Cited

U.S. PATENT DOCUMENTS

| | | | |
|---|---|---|---|
| 2012/0176782 A1 | 7/2012 | Vanderschuit | |
| 2012/0327663 A1 | 12/2012 | Doan | |
| 2013/0051015 A1* | 2/2013 | Creusen | .................... F21K 9/00 |
| | | | 362/235 |
| 2013/0058009 A1 | 3/2013 | Kim et al. | |
| 2013/0058099 A1 | 3/2013 | Shum et al. | |
| 2014/0098546 A1 | 4/2014 | Takahashi et al. | |
| 2014/0146545 A1 | 5/2014 | Shum et al. | |
| 2016/0091176 A1* | 3/2016 | Wang | ....................... F21V 7/043 |
| | | | 362/277 |
| 2017/0363270 A1* | 12/2017 | Ramer | ................. F21V 14/003 |

FOREIGN PATENT DOCUMENTS

| | | |
|---|---|---|
| DE | 102008017118 A1 | 10/2009 |
| EP | 2853809 A1 | 1/2015 |
| GB | 2365108 A | 2/2002 |
| WO | 2014147505 A1 | 9/2014 |

* cited by examiner

LED SPOT WITH CUSTOMIZABLE BEAM SHAPE, BEAM COLOR AND COLOR UNIFORMITY

CROSS-REFERENCE TO PRIOR APPLICATIONS

This application is the U.S. National Phase application under 35 U.S.C. § 371 of International Application No. PCT/EP2016/064412, filed Jun. 22, 2016, which claims the benefit of European Patent Application No. 15174454.7, filed on Jun. 20, 2015. These applications are hereby incorporated by reference herein.

FIELD OF THE INVENTION

The invention relates to a lighting unit as well as a kit of parts comprising a lighting device and a beam modifier. The invention also relates to a method of making such lighting unit.

BACKGROUND OF THE INVENTION

The desire to modify beam characteristics is known in the art. US2013058099, for instance, describes an illumination source configured to output light having a user-modifiable beam characteristic which includes a LED light unit for providing a light output in response to an output driving voltage, a driving module for receiving an input driving voltage for providing the output driving voltage to the LED light unit, a heat sink coupled to the LED light unit for dissipating heat produced by the LED light unit and the driving module, a reflector coupled to the heat sink for receiving the light output, for outputting a light beam having a first beam characteristic, and a lens coupled to the heat sink for receiving the light beam having the first beam characteristic and for outputting a light beam having a second beam characteristic, wherein the lens is selected by the user to achieve the second beam characteristic, and wherein the lens is coupled to the heat sink by the user.

WO2014147505A1 discloses an illumination device having a printed beam shaper arranged at an optical mask coupled to a light exit portion such that, a first and a second portion of light generated by the light emitting element is respectively reflected by an at least partially light reflecting portion of the beam shaper, and respectively is transmitted through the beam shaper via a partially light transmitting region of the beam shaper.

SUMMARY OF THE INVENTION

In order to modify the beam shape of e.g. a LED spot one may e.g. use optical plates that can be snapped to the LED spot by e.g. a magnet or a mechanical snap lock. Several options for such optical plates are possible, like lens arrays, pigmented plates, and louvres to modify beam width, beam shape and color temperature. A drawback of the beam shape modifiers based on lenses or louvres is that such a modifier has to be designed and produced in the traditional way, i.e. it takes a relatively long lead time to design a modifier for a customized beam shape. Furthermore, the louvre solution to create a sharper beam cut-off adds height to the product, which is not always allowable in lamp retrofit applications.

Hence, it is an aspect of the invention to provide an alternative lighting device, which preferably further at least partly obviates one or more of above-described drawbacks. Further, it is an aspect of the invention to provide a solution to the desire to adapt the beam properties of a lighting device at a late stage, which solution preferably further at least partly obviates one or more of above-described drawbacks.

Herein, a beam modifier is proposed, especially for a LED spot lamp or spot lighting luminaire, based on a flat mask at the exit of the beam shaping optics (lens, reflector, TIR (total internal reflection) lens, Fresnel lens, . . . ). The mask may be opaque (absorbing or blocking), translucent (scattering in transmission), or partly transparent, or containing a colorant or a wavelength-converting material e.g. phosphor. Although, generally speaking, there may be no strict relation between the position at the exit window and the direction of the emitted light from a beam shaping optical element, one can often still distinguish certain areas that predominantly contribute to the edge of a beam. In technical terms: in an ideal illumination optics design, the full area of the optics is emitting light in the main direction of the beam (the optics is "fully flashed"), so all positions contribute to the peak intensity. The edge of the beam does not require the full area to be flashed, and usually this is not the case. Therefore by blocking or redistributing the light from the flashed area as seen from a given orientation, one can influence the beam shape. The invention may work best when different parts of the light exit window emit light in different directions, but this is not strictly required. Therefore, the invention is of special relevance for most directional lighting devices, such as spot lamps, spot luminaires, flood lighting fixtures, wall washing fixtures, torch lights, et cetera.

In a first aspect the invention provides a lighting unit comprising a lighting device, wherein the lighting device comprises a light source configured to provide light source light and beam shaping optics configured to shape the light source light into a lighting device beam, wherein the lighting device comprises a window comprising an upstream face directed to the light source and a downstream face (from which the lighting device beam is configured to emanate in a direction away from the light source (in the absence of the beam modifier (see below))), wherein the lighting unit further comprises a beam modifier ("mask") configured adjacent to the window and configured to intercept at least part of said lighting device beam, especially a beam modifier configured adjacent to the downstream face (and configured downstream from the window), and configured to intercept at least part of said lighting device beam downstream from the downstream face, wherein the lighting device and the beam modifier are configured to modify said lighting device beam to provide a lighting unit beam downstream from said beam modifier, wherein the beam modifier comprises a printed beam modifying element. Especially, the beam modifying element is configured as a polarization filter and/or a spectral converter and to intercept up to 80%, such as up to 70%, such as in the range of 10-50%, of a cross-section of said lighting device beam. Especially, the interception is at least 10% of the cross-section of the lighting device beam. The phrase, "intercepting up to 80% of a cross-section" and similar phrases especially indicate that up to 80% of the area of such cross-section is intercepted. Hence, (during use) 20% or more passes non-intercepted and 80% or less, but especially at least 10% of the lighting device beam cross section is modified by the beam modifying element(s).

With such lighting device and such beam modifier a lighting unit can be provided with the desired beam properties, such as suitable for a specific room or space. Hence, with the beam modifier the properties of the lighting device beam of the lighting device can be modified. Further, hardly any depth is needed, as the beam modifier can be very thin, such as in the range up to a few millimeters. Therefore, especially the lighting device may be provided as such, or the lighting device with a beam modifier may be provided. In the former embodiment, one may for instance determine from the lighting device in its application position the beam properties and then define the desired beam properties for the lighting device in the specific application position. Based thereon, a beam modifier can be chosen (e.g. from a library of beam modifiers) or created for the specific lighting device at the specific application position. Thereby, the herein described lighting unit is provided. The beam modifier is herein also indicated as "mask". Hence, especially the beam modifying element may only modify part of the beam, to tune at a late stage the beam into a desired (lighting unit) beam. An interception of less than 5%, such as less than 10%, may not induce (enough) the desired modification, whereas an interception of 80% or more may lead to an inefficient lighting unit. Hence, especially the interception is in the range of 10-80%, such as in the range of 10-50%. It appears that the combination of the lighting device with optics and window, especially a lighting device with optics that do not fully conserve etendue, and the beam modifier having an interception in the range of 10-80% provides a flexible late stage adaptation (by (only) printing, especially 3D printing), maintaining desired beam characteristics and tuning less desired beam characteristics (such as considered less desired at the (expected) place of application of the lighting device) into more desired characteristics or reducing such beam parts.

Hence, in a further aspect the invention also provides a kit of parts comprising (i) a lighting device, wherein the lighting device comprises a light source configured to provide light source light and beam shaping optics configured to shape the light source light into a lighting device beam, wherein the lighting device comprises a window comprising an upstream face directed to the light source and a downstream face (from which the lighting device beam is configured to emanate in a direction away from the light source), and (ii) a beam modifier, especially a plurality of different beam modifiers, wherein each beam modifier comprises a printed beam modifying element, and wherein each beam modifier can functionally be coupled to the lighting device to intercept at least part of said lighting device beam downstream from the downstream face to modify said lighting device beam.

With such kit, the lighting device can be configured in such a way at a specific application position of the lighting device that the desired lighting effect with the lighting device and beam modifier can be obtained. For instance, such kit may comprise two or more such as four or more, like in the range of 2-20 beam modifiers. Hence, the beam modifier may especially be configured in a removable way to the lighting device. Alternatively or additionally, the kit of parts may further comprise two or more windows, with optionally beam modifiers applied to a face of the window (or even both faces of the window).

Besides the mask itself, the invention also provides a production method (for producing the beam modifier and or the lighting unit), which may in an embodiment involves (a) capturing flashed area images from different viewpoints of the spot lamp or luminaire, (b) constructing the mask pattern (e.g. one or more of blocking, scattering, color filtering, color changing (see also below)) by combining the flashed area images from the directions that need modification, and (c) printing the mask (either directly on the optics, on a transparent cap or cover plate, or as a separate 3D-printed mask element). Directly making the mask or a mould for it by a 3D printing/added manufacturing technique can be very attractive not only for a low number of highly customized add-ons but even for regular add-ons due to the rather low market volumes of spot lamps of one type/shape. In this case digital manufacturing allows easy and fast adjustment of the add-on design and production.

Hence, in yet a further embodiment the invention also provides a method for late stage adaptation of a lighting device, wherein the lighting device comprises a light source configured to provide light source light and beam shaping optics configured to shape the light source light into a lighting device beam, wherein the lighting device comprises a window comprising an upstream face directed to the light source and a downstream face (from which the lighting device beam is configured to emanate in a direction away from the light source), wherein the method comprises (i) capturing an image of the light distribution of the lighting device beam emanating from the window, (ii) designing based on the image and a predefined definition for a desired beam a beam modifier, comprising a beam modifying element, configured to modify said lighting device beam to provide a desired lighting unit beam, (iii) (a) printing a beam modifying element on the window or (b) printing a beam modifying element on a support and configuring the support adjacent to the window. Especially, the beam modifying element is configured to intercept up to 80% of a cross-section of said lighting device beam.

With such method, the beam properties, especially light distribution, such as light distribution as function of position relative to the lighting device, may be evaluated and the beam of the lighting device may be modified to a desired shape, for instance for wall washing or accent lighting applications. The beam modifier may be printed at a (3D) printer centre, or may even be printed at home with a (3D) printer. Alternatively the defined beam modifier may be ordered, such as via internet. Hence, in yet a further aspect, the method may at least partly be implemented via e.g. an App for a Smartphone or other type of android device, etc.

Therefore, the invention also involves a computer program product, optionally implemented on a record carrier, which when run on a computer executes the method of (a) receiving an image of a light distribution of a lighting device beam emanating from a window of a lighting device, (b) receiving a definition for a desired beam, (c) designing, based on the image and the predefined definition for the desired beam, a beam modifier, comprising a beam modifying element, configured to modify said lighting device beam, and (d) (i) printing the beam modifying element on the window or (ii) printing the beam modifying element on a support for configuration of beam modifier (optionally with the support) adjacent to the window. The above-mentioned App may be run on a device including a camera, which may be used to capture the image for use in the App.

As indicated above, the lighting device comprises a light source. In a specific embodiment, the light source comprises a solid state LED light source (such as a LED or laser diode). The term "light source" may also relate to a plurality of light sources, such as 2-20 (solid state) LED light sources. Hence, the term LED may also refer to a plurality of LEDs. Alternatively or additionally, the light source may include a halogen type light source, but especially LED light sources (amongst others due to the substantial absence of IR radiation). Especially, the lighting device is configured to provide white light. The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL. However, the lighting device may also be configured to provide colored light. Further, the lighting device may be configured to provide light that is tunable in color.

Further, the lighting device comprises beam shaping optics. Especially, the beam shaping optics comprises one or more of a lens, a TIR (total internal reflection) lens, a Fresnel lens, a tapered light guide, and a reflector. Hence, the lighting device may comprise a plurality of different beam shaping optics. In a specific embodiment, the lighting device at least comprises a reflector, especially configured to impose some collimation of the light source light. Especially, the lighting device may include one or more of a solid state light source and a halogen at least partly configured in a reflector. Hence, in an embodiment the lighting device comprises a spot light, wherein the beam shaping optics comprises a reflector at least partly enclosing the light source, and wherein the light source especially comprises a solid state light source. In an alternative embodiment, the lighting device may include a solid state light source and one or more of a TIR lens and a Fresnel lens.

Further, also lenses may be applied. Especially in the latter embodiment, the beam shaping optics may be at least partly incorporated in the window. Hence, in an embodiment the window comprises said beam shaping optics. Especially, the beam shaping optics comprise non-imaging optics. The beam shaping optics are configured to shape the light source light into a lighting device beam. Hence, at least part of the light source light, especially substantially all of the light source light, is shaped into a lighting device beam by the beam shaping optics. The term "beam shaping optics" may also refer to a plurality of different beam shaping optics.

Especially however, the window has a substantially flat downstream face. The window comprises a transmissive material, especially a transparent material, such as may comprises one or more materials selected from the group consisting of PE (polyethylene), PP (polypropylene), PEN (polyethylene napthalate), PC (polycarbonate), polymethylacrylate (PMA), poly(methyl)methacrylate (PMMA) (Plexiglas or Perspex), cellulose acetate butyrate (CAB), silicone, polyvinylchloride (PVC), polyethylene terephthalate (PET), including in an embodiment (PETG) (glycol modified polyethylene terephthalate), PDMS (polydimethylsiloxane), and COC (cyclo olefin copolymer). Especially, the material may comprise an aromatic polyester, or a copolymer thereof, such as e.g. polycarbonate (PC), poly(methyl)methacrylate (P(M)MA), polyglycolide or polyglycolic acid (PGA), polylactic acid (PLA), polycaprolactone (PCL), polyethylene adipate (PEA), polyhydroxy alkanoate (PHA), polyhydroxy butyrate (PHB), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN); especially, the material may comprise polyethylene terephthalate (PET). Hence, the material is especially a polymeric material. However, in another embodiment material may comprise an inorganic material. Preferred inorganic materials are selected from the group consisting of glasses, (fused) quartz, transmissive ceramic materials, and silicones. Also hybrid materials, comprising both inorganic and organic parts may be applied.

The beam modifying element may have one or more functions. For instance, the lighting device beam can be made more symmetric in a specific direction, or can be made more concentrated in a specific direction. Without using e.g. louvers, that may add a substantial height, this may be achieved. Alternatively or additionally, the color homogeneity may be tuned (in a specific direction), etc. Hence, in in particular the beam modifier is configured to modify the lighting device beam by one or more of polarization filtering, and spectral converting the lighting device beam. Optionally, such as in the case when a LED and a reflector are used, this may imply a redistribution of the light over the window. Herein the term "polarization filtering" implies that selectively one or more types of polarizations do not penetrate through the beam modifier (or are at least reduced in intensity). Herein, the terms "converting" or "spectral converting" refer to absorbing at least part of the lighting device light and convert it into luminescent material light. Hence, the converter will include a luminescent material. Instead of or in addition to a luminescent material, a pigment or dye could be used to (only) absorb part of the lighting device light. Hence, a pigment may (also) be used to tune the spectral distribution of the lighting device light. However, the use of pigments as such is disadvantageous compared to the use of, for example, conversion materials with respect to efficacy of the lighting device, i.e. with pigments light is absorbed and lost while with conversion materials light is absorbed and reused as converted light.

Hence, printing may e.g. include printing a dye, or other absorbent material, and/or a luminescent material. Alternatively or additionally, printing may also include 3D printing. Hence, in an embodiment the beam modifier comprises a 3D printed beam modifying element. The term "beam modifying element" may also refer to a plurality of beam modifying elements. The beam modifying element especially only is configured to intercept part of the lighting device light. Hence, whereas the beam modifier may entirely intercept the entire lighting device beam, e.g. cover the entire window, especially only part of the beam modifier comprises said beam modifier element. Hence, part of the lighting device beam may keep substantially unmodified. For instance, the beam modifier may modify in the range of 5-80%, such as 10-50% of the beam cross-section. When e.g. the beam modifier covers the window, then only 5-50% of the window may be covered with the beam modifying element. Hence, in embodiments the beam modifying element is configured at 10-80% (of the area) of the downstream face (of the window). The beam cross-section is especially defined perpendicular to an optical axis of the lighting device beam.

In a specific embodiment, the lighting device comprises a spot light, wherein the beam shaping optics comprises a total internal reflector lens, wherein the light source especially comprises a solid state light source. Further, especially the beam modifying element is configured to intercept up to 80%, such as up to 50%, especially at least 10%, of a cross-section of said lighting device beam.

Additive manufacturing (AM) is a growing field of materials processing. It can be used for rapid prototyping, customization, late stage configuration, or making small series in production. Additive Manufacturing (AM) is a group of processes making three-dimensional objects from a 3D model or other electronic data source primarily through additive processes. Hence, the term "3D printing" is substantially equivalent to "additive manufacturing" or "additive manufacturing method". The additive process can involve the binding of grains (via sintering, melting, or gluing) or of layers of material (via successive deposition or production of the layers, e.g. polymerization), etc. A widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Another term for FDM is "fused filament fabrication" (FFF). Herein, the term "filament 3D printing" (FDP) is applied, which is considered to be equivalent to FDM or FFF. In general, FDM printers use a thermoplastic filament, which is heated to its melting point and then extruded, layer by layer, (or in fact filament after filament) to create a three dimensional object. FDM printers can be used for printing a complicated object. Hence, the method includes production of the 3D printed object, for example via an FDM 3D printing.

The 3D printed object is especially (at least partly) made from 3D printable material (i.e. material that may be used for 3D printing). In general these (polymeric) materials have a glass transition temperature Tg and/or a melting temperature Tm. The 3D printable material will be heated by the 3D printer before it leaves the nozzle (assuming e.g. FDM) to a temperature of at least the glass transition temperature, and in general at least the melting temperature. Hence, in an embodiment the 3D printable material comprises a thermoplastic polymer, such as having a glass transition temperature (Tg) and/or a melting point (Tm), and the printer head action comprises heating the one or more of the receiver item and 3D printable material deposited on the receiver item to a temperature of at least the glass transition temperature, especially to a temperature of at least the melting point. In yet another embodiment, the 3D printable material comprises a (thermoplastic) polymer having a melting point (Tm), and the printer head action comprises heating the one or more of the receiver item and 3D printable material deposited on the receiver item to a temperature of at least the melting point. Specific examples of materials that can be used (herein) can e.g. be selected from the group consisting of acrylonitrile butadiene styrene (ABS), polylactic acid (PLA), polycarbonate (PC), polyamide (PA), polystyrene (PS), lignin, rubber, etc.

As indicated above, also techniques other than FDM may be applied, such as inkjet printing, stereo-lithography, spray printing, powder bed printing, etc. As indicated above, whatever printable material is used, it will especially include an electrically conducting species or a precursor thereof. The term "printable material" may also refer to a plurality of different 3D printable materials. The term "printable material" especially refers to material that can be printed. For instance, in the case of FDM the printable material may comprise a heated polymer that is flowable. The printable material may be solid at room temperature, but upon heating may become printable (i.e. especially flowable). This heating is especially intended to provide a flowable or printable material. In the case of stereo-lithography, the printable material may comprise liquid material that is curable (by light, such as laser radiation), etc. In the case of inkjet printing, the printable material may comprise particles in a liquid (that may (be) evaporate(d) after deposition). In the case of powder binding the printable material may comprise particles that are hold together by a binding material (glue).

In the case of powder sintering or melting the printable material may comprise particles that are sintered or melted together by heat.

As indicated above, the method includes a 3D printing stage, the 3D printing stage comprising 3D printing a 3D printable material to provide the 3D printed object (i.e. manufacturing the 3D printed object), from at least said printable material. The term "printed material" especially herein refers to printable material that has been deposited or printed. Hence, the term "printable material" herein especially refers to the material not (yet) deposited or printed. The printing stage may, amongst others, also include a curing. For instance, printed material may be cured after printing, followed by further printing on the cured printed material. Hence, herein "printing the beam modifying element" may comprise 3D printing the beam modifying element.

With (3D) printing, the height or depth of the beam modifier may be kept very low. Especially, the beam modifier may have a height (h1) in the range of 0.1-10 mm, such as in the range of 0.5-5 mm. Alternatively, the height (or thickness) may be equal to or lower than about one fifth of the beam shaping optics height, i.e. we add equal to or less than 20% height. For a typical 1 cm optic this is less than 2 mm height. Especially, the height may be at least about 0.1 mm. The beam modifier may essentially consist of the beam modifying elements, which will in general be the case when the beam modifying element(s) are directly printed on the window. However, the beam modifier may also include a support. Hence, in an embodiment the beam modifier comprises a support with the beam modifying element configured on said support, or wherein the printed beam modifying element is configured on said downstream face. The support may e.g. comprise a foil that may be adhered to the window. Alternatively, the support may comprise a thin plate. The support may especially comprise one or more of the above-mentioned light transmissive materials. The above indicated height (of 0.1-10 mm) may also refer to the beam modifier including the support. Hence, the method may also include printing the beam modifying element on the support and configuring the support e.g. on the downstream face of the window. Alternatively, the beam modifying element on a support may be configured with the beam modifying element to the (downstream face of the) window, whereafter the support may be removed. In a variant, the beam modifying element (including support) may be configured at a (short) distance of the window, such as at a shortest distance in the range of 0.1-20 mm, like 0.5-5 mm. Further, with 3D printing it is relatively easy to add mechanical features to align the mask to the optic, and/or to create a mechanical snap to the lighting device. Additionally or alternatively, the beam modifier may be snapped (with one or more snapping elements) to the lighting device. The beam modifier may include a support and the printed beam modifying element. The printed beam modifying element may be configured adjacent to the window, such as on the window. Optionally, before or after configuration of the beam modifier to the lighting device, the support may be removed. Hence, the beam modifier comprises the beam modifying element and optionally the support. The beam modifier may optionally be self-supporting. Hence, in an embodiment in the 3D printing process a self-supporting beam modifier may be provided.

In a specific embodiment, the invention also includes 3D scanning the device, especially the window, to provide a 3D profile, wherein the beam modifier is designed based on the image, on the 3D profile, and a predefined definition for a desired beam. In this way, the beam modifier may be best adapted to the device, especially the window. Especially in this embodiment, the beam modifier may be in physical contact with the window. Hence, the invention also provides making a mechanical 3D scan of the device to design the mechanical fit to the device (e.g. the size of the mask and the shape of the mechanical snap connector). Therefore, the invention also provides a computer program product, optionally implemented on a record carrier, which when run on a computer executes the method of (a) receiving an image of a light distribution of a lighting device beam emanating from a window of a lighting device and a 3D profile of the lighting device (with window), (b) receiving a definition for a desired beam, (c) designing, based on the image, the 3D profile, and the predefined definition for the desired beam, a beam modifier, comprising a beam modifying element, configured to modify said lighting device beam, and (d) (i) printing the beam modifying element on the window or (i) printing the beam modifying element on a support for configuration of beam modifier (optionally with the support) adjacent to the window.

As indicated above, asymmetry of the beam in a specific direction may be diminished with the beam modifying element. Alternatively, asymmetry may be introduced or enhanced, dependent upon the desire of the (end) user. Hence, in an embodiment the lighting device beam has an optical axis (O), wherein beam modifier is configured non-centrosymmetric relative to the optical axis (O). Hence, the above-mentioned method may also comprise (i) capturing a plurality of images of the light distribution of the lighting device beam under different angles ($\theta,\varphi$) with the optical axis (O), and (ii) designing based on the plurality of images and the predefined definition of the desired beam a beam modifier, comprising a beam modifying element, configured to modify said lighting device beam to provide the desired lighting unit beam. Here, $\theta$ may indicate the zenith angle, and $\varphi$ may indicate the azimuth angle.

Especially, the beam modifying element(s) do not cover the entire window (see also above). Hence, at least part of the lighting device beam is not substantially modified (other than refraction by the optional support). For instance, 10-80% of the window may be covered with the beam modifying elements (with optionally an optional support in between, though the beam modifying elements may also be sandwiched between the window and the support). Further, the beam modifier may be applied to the upstream window and/or the downstream window. For late stage adaptation, especially the downstream window may be of relevance.

Further, especially there is thus a relation between the beam modifier and the light distribution of the non-modified lighting device beam, especially with the light distribution on the downstream face of the lighting device (when the beam is not yet modified). Hence, especially the beam modifier is configured to modify only part of the beam. Therefore, especially the beam modifier element only intercepts part of the lighting device beam and leave part of the lighting device beam non-intercepted (and thus substantially non-modified).

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, etc.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

To clarify the effect of the invention, light ray trajectories for several optical elements were calculated.

Figure 1A:
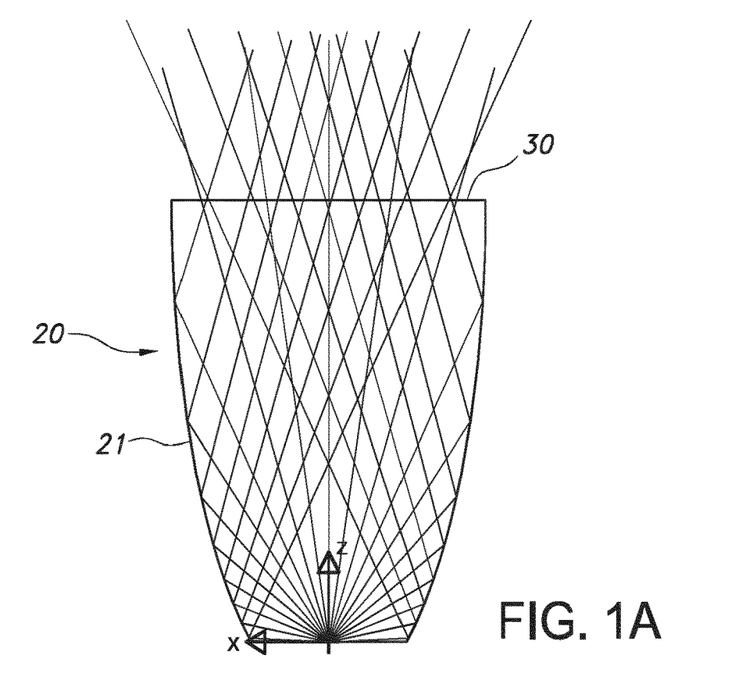
FIGS. 1a-1d schematically depict some aspects and background of the invention.

In a first example, see FIG. 1a, a CPC (compound parabolic concentrator) is used as a reflector 21. In this type of beam shaping optics 20, the etendue is conserved. As a result, the full exit window, indicated with Ref. 30, is utilized for all light directions, i.e. the exit is fully flashed for all viewing directions within the beam. The present invention, which proposes to shape the beam by applying a mask at the exit window, is substantially not function with such etendue-conserving collimator. The present invention is especially directed to beam modifying of beams due to non-imaging optics that are not completely etendue conserving, i.e. the exit window is not fully flashed in all viewing directions within the beam. Hence, the optics used are especially not completely etendue conserving, i.e. only partly etendue conserving. Especially, the exit window is not fully flashed in all viewing directions within the beam.

In the next examples, three different TIR collimator designs are shown. In these beam shaping elements, the beam is formed by a center lens in combination with a (TIR) reflecting surface. Many designs are possible, but here three different designs of the TIR surface are shown by way of example. In the figures below, R arrows indicate ray paths for the beam edge, B arrows indicate ray paths for the beam center.

Figure 1B:
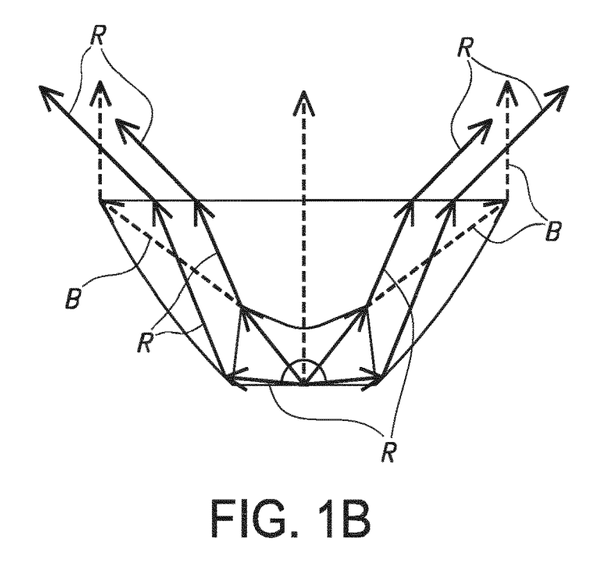
Figure 1C:
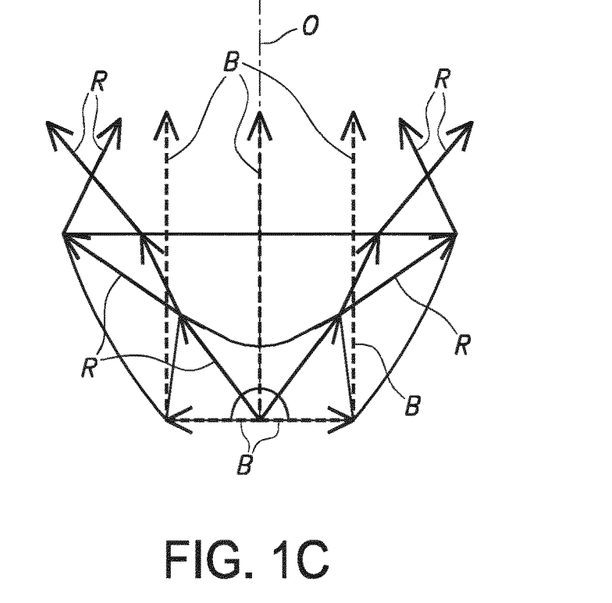
Figure 1D:
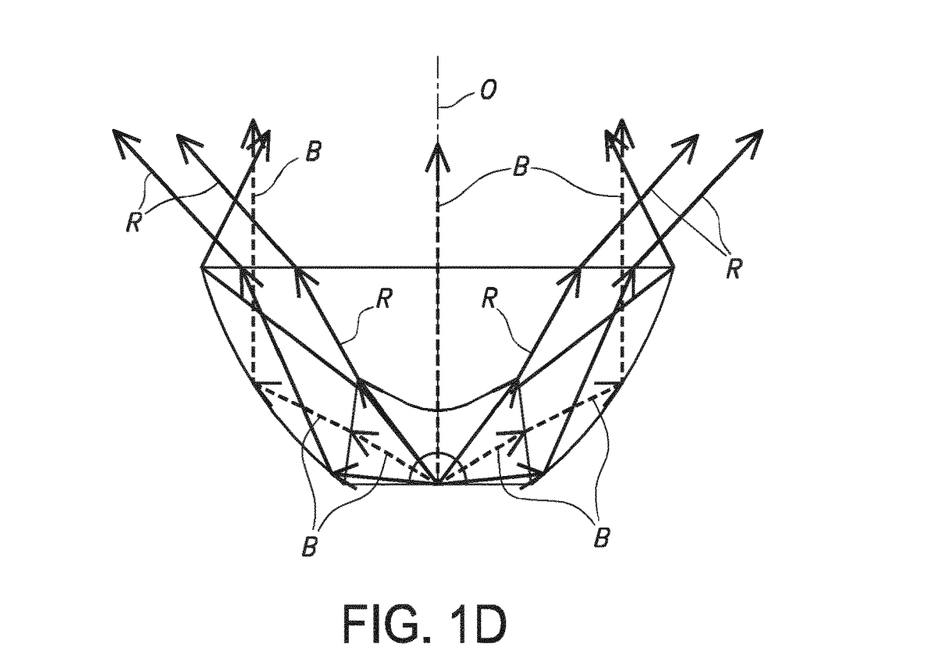

FIG. 1b shows the beam center exiting from collimator center and collimator edge, beam edge exiting from intermediate area. FIG. 1c shows the beam center exiting from collimator center, beam edge exiting from collimator edge (but both edge directions mixed). FIG. 1d shows the beam edge exiting from three rings on the collimator, beam center exiting from the collimator center and from an area close to the edge of the collimator. Considering the rays in these examples, one sees that the edge and center of the beam can exit at different positions of the collimator, and in some designs they are better separable than in other. For example, in TIR design (FIG. 1b), all the rays aimed at the left edge of the spot exit the collimator from an area just left from the center. In design (FIG. 1c), there are two areas that emit rays to the left (just left from the center and the extreme right edge) and in design (FIG. 1d) there are even three areas from which light exits to the left. So in design (FIG. 1b) the beam is most easy to modify with a mask.

Figure 2A:
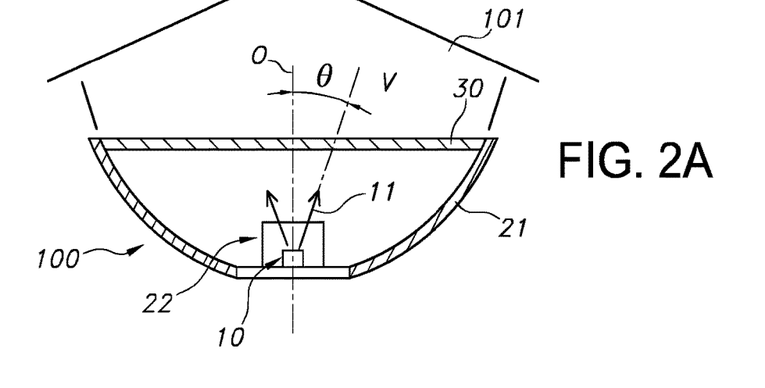
FIGS. 2a-2e schematically depicts some light distributions under different viewing angles.

In the following, a number of non-limiting more detailed embodiments are discussed. FIG. 2a very schematically depicts a lighting device 100 with a TIR collimator as reflector 21 designed for a 24D (beam width 24°) spot and a lens 22. Looking straight into the spot, i.e. along the optical axis O, it appears that not the complete area is emitting light, but only the center and a ring around it, see FIG. 2b with a "flashed area" from a perpendicular view (all light between 2×10°). When looking from the side (at a 25° angle along the optical axis O), the center flashed area moves in one direction, and the flashed ring deforms and moves into the opposite direction, see FIG. 2c with a "flashed area" viewed from a 25° off-axis direction (25°+/−15°). Looking at the spot from 30 or 35° off-axis results in a further movement and shrinkage of the flashed area, until the eye moves out of the beam and the exit window is not flashed at all, see FIG. 2d with a "flashed area" viewed from a 30+/−10° off-axis direction, and FIG. 2e with a "flashed area" viewed from a 35+/−5° off-axis direction. Based on the change in observed shape and position of the flashed area as a function of viewing direction, one may design a mask to modify light in a specific direction (see further below). The angles relative to the optical axis O are indicated with θ (zenith angle) (see FIG. 2a) and φ (azimuth angle) (see FIG. 2b). By way of example, in FIG. 2b, axis x,y,O are indicated (with O representing the optical axis).

Figure 3A:
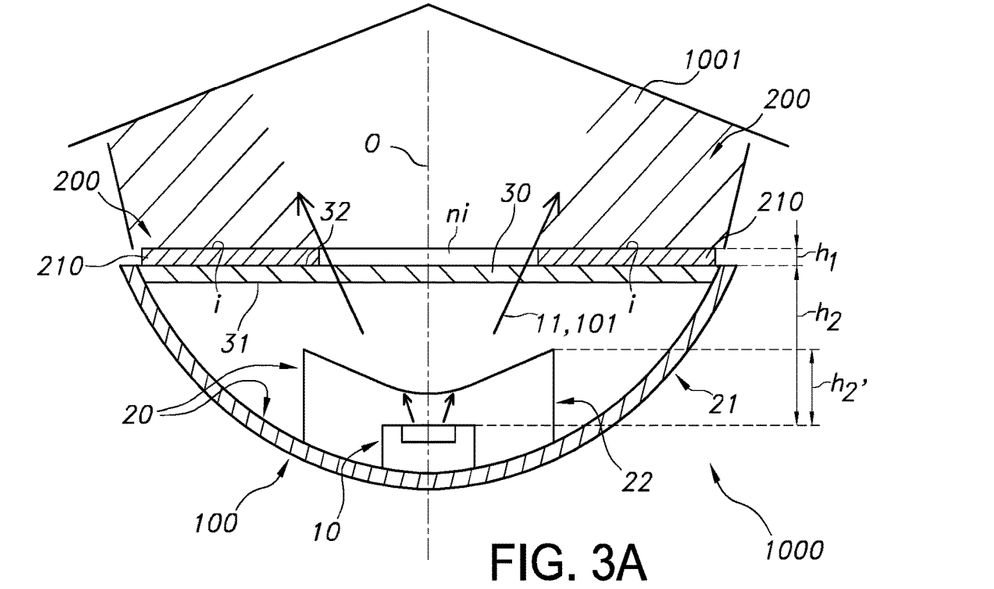
FIGS. 3a-3e schematically depict some aspect of the invention.

FIG. 3a schematically depicts an embodiment of the lighting unit 1000 as amongst others described above. The lighting unit 1000 comprises a lighting device 100. The lighting device 100 comprises a light source 10 configure to provide light source light 11 and beam shaping optics 20 configured to shape the light source light into a beam 101. Here, by way of example the beam shaping optics 20 comprises a lens 22 and a reflector 21. Further, the lighting device 100 comprises a window 30 comprising an upstream face 31 directed to the light source 10 and a downstream face 32 from which the lighting device beam 101 is configured to emanate in a direction away from the light source 10. The lighting unit 1000 further comprises a beam modifier 200 configured adjacent to the downstream face 32 and configured to intercept at least part of said lighting device beam 101 downstream from the downstream face 32. The beam modifier 200 is (thus) configured downstream from the beam shaping optics 20. Especially, the beam shaping optics 20 are configured downstream from the light source 10. The lighting device 100 and the beam modifier 200 are configured to modify said lighting device beam 101 to provide a lighting unit beam 1001. The beam modifier 200 comprises a printed beam modifying element 210. The beam modifier 200 is configured to modify the lighting device beam 101 by one or more of polarization filtering and spectral converting the lighting device beam 101. Especially, the beam modifying element(s) do not cover the entire window 30. Hence, at least part of the lighting device beam 101 is not substantially modified (other than refraction by the optional support (see below)). As also shown in FIG. 3a, the beam modifying element does not entirely intercept the lighting device beam, but only up to 80%, such as up to 70%, such as in the range of 10-50%, of a cross-section of said lighting device beam 101. The intercepted part is indicated with reference i and the non-intercepted part is indicated with reference ni.

Hence, herein the beam modifier 200 is herein also indicated as mask, as it may partly mask, but not entirely. Hence, the beam modifying element 210 may not be uniform. In the specific embodiment of FIG. 3a, the % of interception of the lighting device beam is substantially identical to the coverage of the window 30 with the beam modifying element 210.

Note that in FIG. 3a the lighting unit beam 1001 is configured downstream from the entire beam modifier 200. Would the beam modifying element 210 be entirely blocking, then the beam may be more narrow. The changed properties of the beam downstream from the beam modifying element is schematically indicated with the hatched area. The height of the beam shaping optics 20 is indicated with reference h2, which includes also the reflector 21. Would only e.g. the lens 22, here a TIR lens, be applied, then the height of the beam shaping optics is indicated with reference h2'.

Figure 3B:
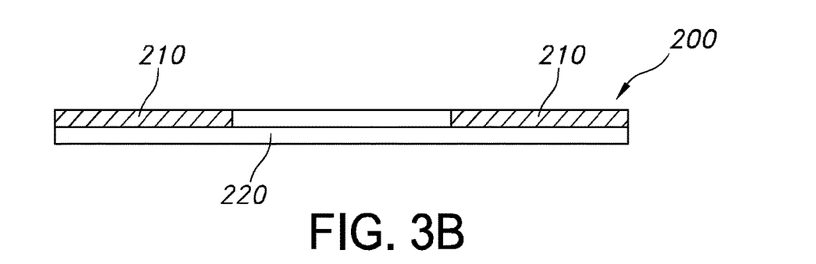

Especially, the beam modifier 200 comprises a 3D printed beam modifying element 210. The beam modifier 200 is in this embodiment configured adjacent to the downstream face 32 and configured to intercept at least part of said lighting device beam 101 downstream from the downstream face 32. Here, the beam modifier is in physical contact with the window. However, there may optionally also be a (small) gap in between. The beam modifier 200 has a height h1 in the range of 0.1-10 mm. FIG. 3b schematically depict an embodiment of the beam modifier 200 comprising a support 220 with the beam modifying element 210 configured on said support 220. The printed beam modifying element 210 may thus be configured on said downstream face 32 or optionally on said upstream face 31. The support 220 or the beam modifying element 210 may be adjacent to the window 30, or especially be in physical contact with the window 30.

Figure 3C:
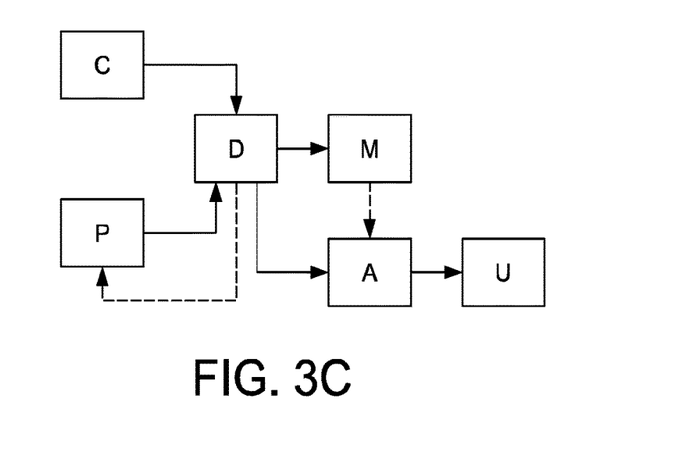

FIG. 3c schematically depicts a possible workflow for creation of the lighting unit 1000. First, the parameters for the desired beam are defined and images of the lighting device beam are captures. These stages are indicated with C (capturing) and P (predefining) (wherein the desired beam is defined). Based thereon, the beam modifier is designed in a design stage D; with optionally iteration steps (for instance one may model the beam and vary the beam modifier parameters such that the desired beam is obtained (in the model)). Then, the beam modifier is generated in a making stage M or is directly printed on the window in an application stage A. After making of the beam modifier (not directly on the window), the beam modifier is applied adjacent to the window in the application stage A. Thereafter, the lighting unit can be used in a use stage U. Stage C may optionally also include a 3D scanning or mapping of the lighting device, especially its window.

Figure 3D:
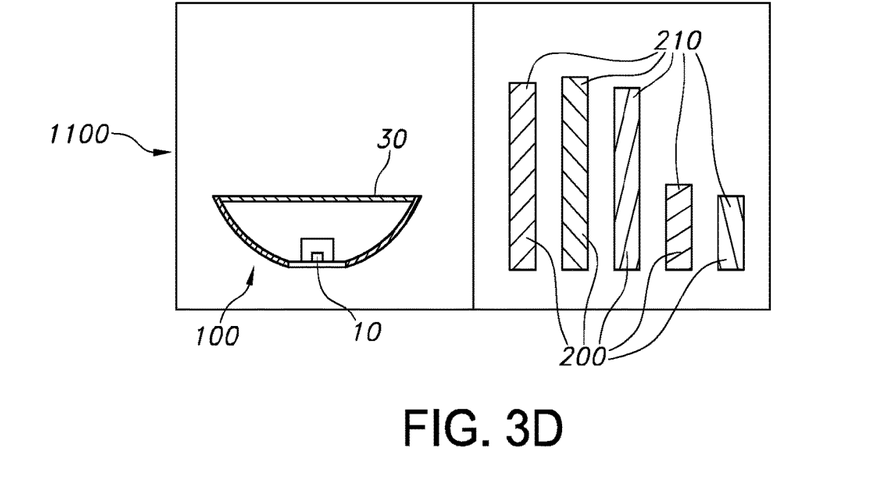

FIG. 3d schematically depicts a kit 1100 of parts comprising a lighting device 100, wherein the lighting device 100 comprises a light source 10 configured to provide light source light 11 and beam shaping optics 20 configured to shape the light source light into a lighting device beam 101. As indicated above, the lighting device 100 comprises a window 30 comprising an upstream face 31 directed to the light source 10 and a downstream face 32 from which the lighting device beam 101 is configured to emanate in a direction away from the light source 10. The kit further comprises at least a beam modifier 200, especially a plurality of different beam modifiers 200, wherein each beam modifier 200 comprises a printed beam modifying element 210, and wherein each beam modifier 200 can functionally be coupled to the lighting device 100 to intercept at least part of said lighting device beam 101 to modify said lighting device beam 101. Hence, with such kit 1100 the user may choose which beam modifier(s) are used and to be applied to the lighting device 100 (to create the lighting unit 100 (see e.g. FIG. 3*a*). Therefore, one or more of a customizable beam shape, beam color and beam color uniformity may in this way be enabled.

Figure 3E:
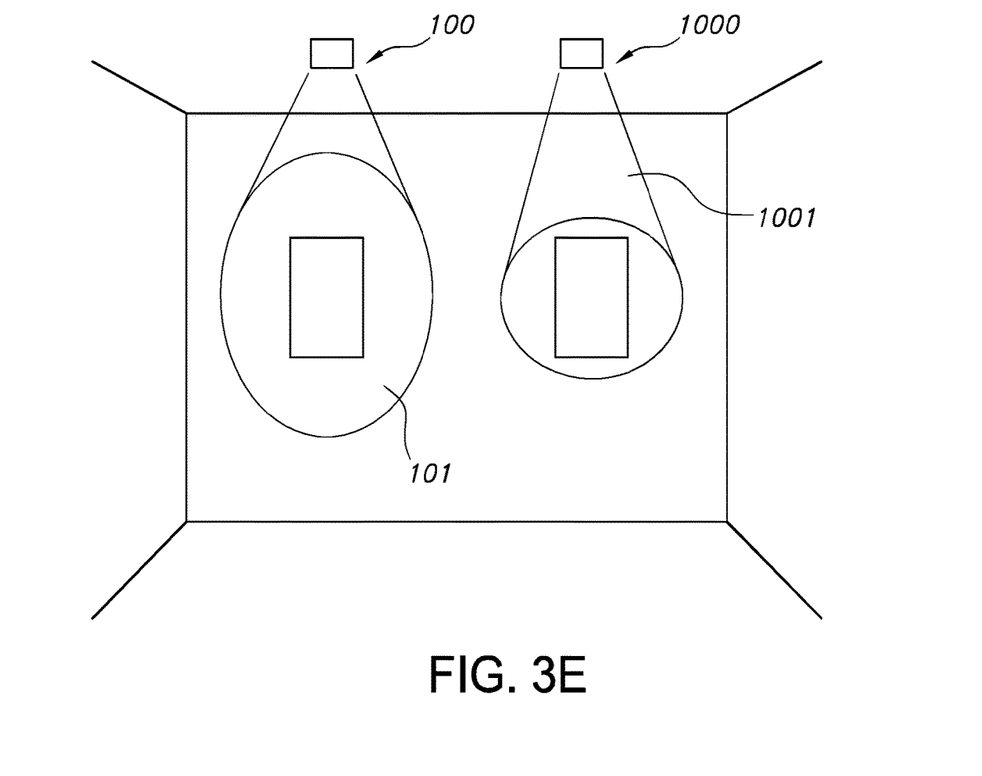

FIG. 3*e* schematically depicts an example of a possible function of the beam modifier. Two similarly shaped paintings on a wall are illumination with on the left a lighting device and on the right a lighting unit. The beam of the lighting device on the left is not (late stage) modified; the beam of the lighting device on the right is (late stage) modified to provide the lighting unit with the optimized lighting unit beam 1001.

Figure 2B:
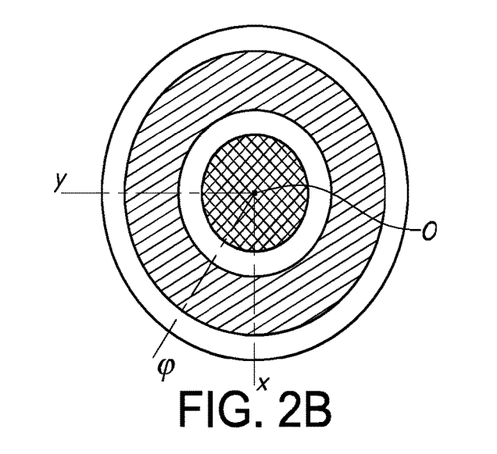
Figure 2C:
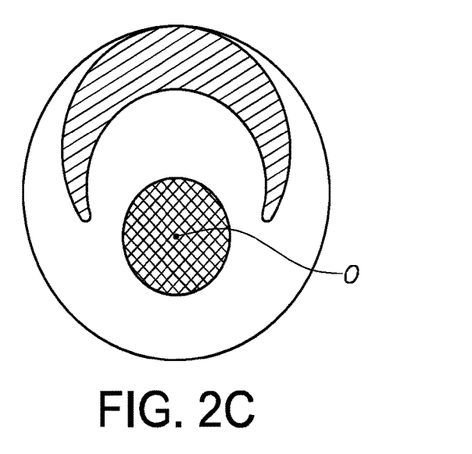
Figure 2D:
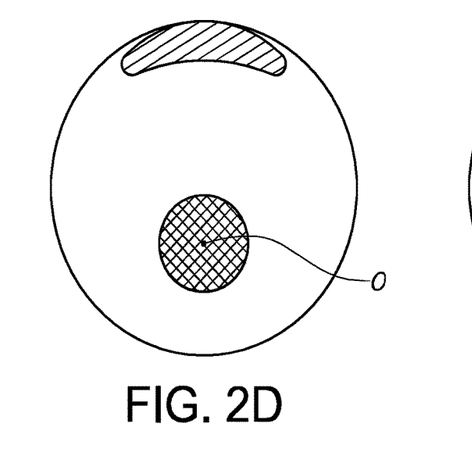
Figure 2E:
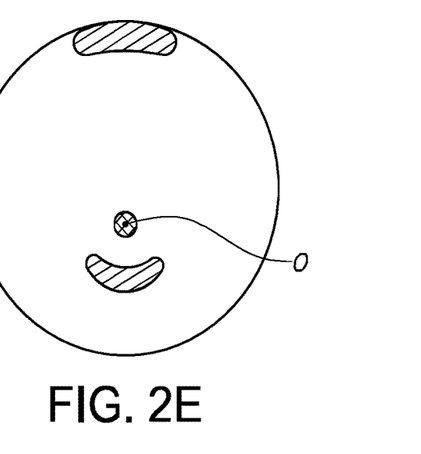
Figure 4A:
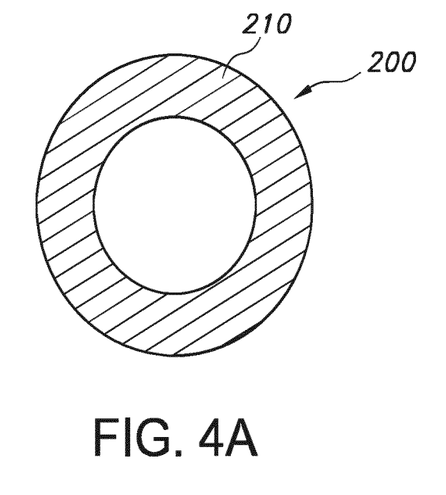
FIGS. 4a-4d schematically depicts some beam modifiers. The schematic drawings are not necessarily on scale.
Figure 4B:
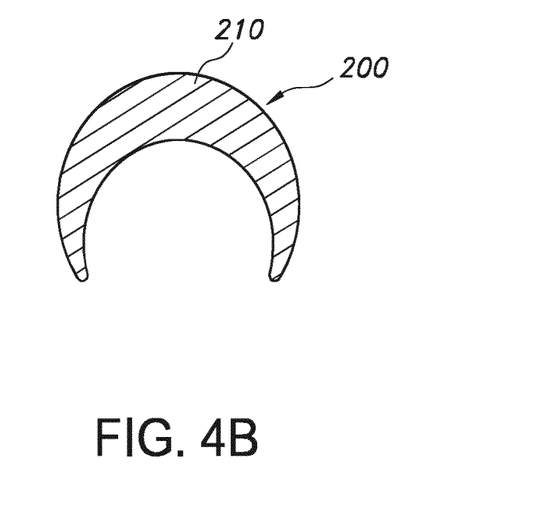
Figure 4C:
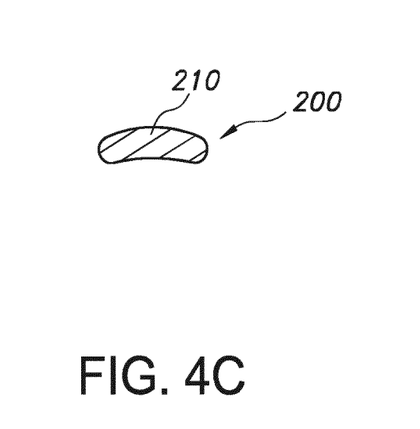
Figure 4D:
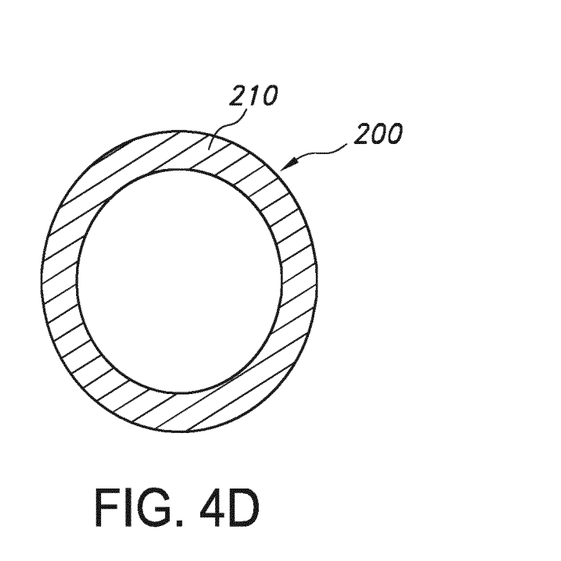

FIGS. 4*a*-4*c* are related to FIGS. 2*b*-2*d* respectively. These Figures show embodiments of the beam modifier 200 which may e.g. be used to reduce asymmetry of the beam under specific angles. For instance, when using the beam modifiers 200 of FIGS. 4*a*-4*b*, the use thereof may reduce the circle around the central intense part or the asymmetry under specific angles, respectively. The same applies to FIG. 4*c* and FIG. 2*d*. FIG. 4*d* may be substantially the same as FIG. 4*a*. Where FIGS. 4*a*-4*c* may e.g. be blocking, Fig. by way of example uses a luminescent material 211. For instance, assuming a blue LED with a yellow luminescent material as light source, such light source often has a lower color temperature along the optical axis and a higher color temperature offset of the optical axis. By using the beam modifier with luminescent material 211, this offset light may be partly (further) converted, providing lighting unit light with a more homogeneous low color temperature.

In an example, the collimator is combined with an absorbing mask in the shape of the flashed area as observed between 10 and 40° off-axis. It was observed that the intensity distribution at one side is filtered away.

When one would desire to block the light between 20-40° at one side of the beam, one need to use a shape that resembles the flashed area when viewed from these directions (see also FIGS. 2*c* and 4*b*).

In a further example it was demonstrated that the mask is not necessarily only converting but additionally could simultaneously be absorbing and/or scattering. The result is that the beam becomes asymmetric, and broad tail of light is added to the beam. This effect can be tuned by changing the level of scattering of the translucent material.

In yet another example, the mask was chosen neither to block nor to scatter, but selectively absorbing a part of the spectrum in combination with conversion. In this particular example, we used three masks that transmit either red, green or blue light, each at a different side of the spot beam. The light which is absorbed is converted to another color (as one uses a wavelength-converting material e.g. phosphor).

In another example, the color-filter masks may be used not to create colors, but to eliminate color non-uniformity instead. Currently, many spot lamps are based on mid-power LEDs because of their relatively low cost. A drawback of these LEDs is that they are not uniform in color, and this non-uniformity shows up in the beam, usually in the form of an ugly yellowish ring at the edge of the beam (see picture below). A pattern of blue and/or yellow absorbing materials that simultaneously convert the absorbed light (more yellow absorption in the flashed area as viewed from the beam edge) could be applied to improve the color uniformity. At the same time, the overall color point may be tuned as well. This allows an angle-dependent tuning of the color point. This allows the customer also to sacrifice efficiency for color uniformity at a late stage and to a customizable quality level.

Above, some examples of asymmetric beam modifications. In a further example, a symmetric beam was modified. The edge of the spot (rays between 30-40° off-axis) emanates from three ring-shaped areas on the collimator exit.

The mask or beam modifier can be made of different materials, for example the support (bars) can be transparent, a part of the mask can be black to block the light, and a part containing phosphors to create a colored effect. 3D-printing is particularly suited for manufacturing such multi-material components. The masks can be add-ons that can be added or removed from the lamp. They can also be directly deposited/glued/3D-printed on the lamp to ensure a closer contact between the lamp optic and the mask.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A lighting unit comprising a lighting device, wherein the lighting device comprises a light source configured to provide light source light and beam shaping optics configured to shape the light source light into a lighting device beam, wherein the lighting device comprises a window comprising an upstream face directed to the light source and a downstream face, wherein the lighting unit further comprises a beam modifier configured adjacent to the window and configured to intercept at least part of said lighting device beam, wherein the lighting device and the beam modifier are configured to modify said lighting device beam to provide a lighting unit beam downstream from said beam modifier, wherein the beam modifier comprises a printed beam modifying element, and wherein the beam modifying element is configured to intercept up to 80% of a cross-section of said lighting device beam, wherein the beam modifier comprises a 3D printed beam modifying element and is configured to modify the lighting device beam by one or more of polarization filtering and spectral converting the lighting device beam, and wherein the beam shaping optics comprises one or more of a lens, a TIR lens, a Fresnel lens, and a reflector.

2. The lighting unit according to claim 1, wherein the beam modifier is configured adjacent to the downstream face and configured to intercept at least part of said lighting device beam downstream from the downstream face.

3. The lighting unit according to claim 1, wherein the beam modifier has a height in the range of 0.1-10 mm.

4. The lighting unit according to claim 1, wherein the beam modifier comprises a support with the beam modifying element configured on said support, or wherein the printed beam modifying element is configured on said downstream face.

5. The lighting unit according to claim 1, wherein the lighting device beam has an optical axis, wherein beam modifier is configured non-centrosymmetric relative to the optical axis.

6. The lighting unit according to claim 1, wherein the window comprises said beam shaping optics.

7. The lighting unit according to claim 1, wherein the beam shaping optics comprise non-imaging optics.

8. The lighting unit according to claim 1, wherein the lighting device comprises a spot light, wherein the beam shaping optics comprises a total internal reflector lens, wherein the light source comprises a solid state light source, and wherein the beam modifying element is configured to intercept 5-50% of a cross-section of said lighting device beam.

9. A kit of parts comprising (i) a lighting device, wherein the lighting device comprises a light source configured to provide light source light and beam shaping optics configured to shape the light source light into a lighting device beam, wherein the lighting device comprises a window comprising an upstream face directed to the light source and a downstream face from which the lighting device beam is configured to emanate in a direction away from the light source, and (ii) a plurality of different beam modifiers, wherein each beam modifier comprises a printed beam modifying element, and wherein each beam modifier can functionally be coupled to the lighting device to intercept at least part of said lighting device beam to modify said lighting device beam, wherein the beam modifying element is configured to intercept up to 80% of a cross-section of said lighting device beam, wherein the beam modifier comprises a 3D printed beam modifying element and is configured to modify the lighting device beam by one or more of polarization filtering and spectral converting the lighting device beam, and wherein the beam shaping optics comprises one or more of a lens, a TIR lens, a Fresnel lens, and a reflector.

10. A method for late stage adaptation of a lighting device, wherein the lighting device comprises a light source configured to provide light source light and beam shaping optics configured to shape the light source light into a lighting device beam, wherein the lighting device comprises a window comprising an upstream face directed to the light source and a downstream face from which the lighting device beam is configured to emanate in a direction away from the light source, wherein the method comprises (i) capturing an image of the light distribution of the lighting device beam emanating from the window, (ii) designing based on the image and a predefined definition for a desired beam a beam modifier, comprising a beam modifying element, configured to modify said lighting device beam to provide a desired lighting unit beam, (iii) printing the beam modifying element on the window or printing a beam modifying element on a support and configuring the support adjacent to the window, wherein the method further comprises 3D scanning the window to provide a 3D profile, wherein the beam modifier is designed based on the image, on the 3D profile, and a predefined definition for a desired beam, and wherein printing the beam modifying element comprises 3D printing the beam modifying element.

11. The method according to claim 10, wherein the lighting device beam has an optical axis, wherein the method comprises (i) capturing a plurality of images of the light distribution of the lighting device beam under different angles with the optical axis, and (ii) designing based on the plurality of images and the predefined definition of the desired beam a beam modifier, comprising a beam modifying element, configured to modify said lighting device beam to provide the desired lighting unit beam.

* * * * *